United States Patent

[11] 3,532,020

[72] Inventors Edmund Sandborn
Beaconsfield, Quebec;
Alfred Azzopardi, St. Laurent, Quebec, Canada
[21] Appl. No. 720,685
[22] Filed April 11, 1968
[45] Patented Oct. 6, 1970
[73] Assignee S.K.S. Ltd.,
Montreal, Quebec, Canada,
a corporation of Canada

[54] PRESS FOR CUTTING RUBBER STENCILS
4 Claims, 10 Drawing Figs.
[52] U.S. Cl. .................................................. 83/658,
101/128.4, 101/407, 269/289
[51] Int. Cl. ...................................................... B26d 7/20
[50] Field of Search ............................................ 83/658,
684, 691; 101/128.2, 128.4, 407; 269/289

[56] References Cited
UNITED STATES PATENTS
| | | | |
|---|---|---|---|
| 1,084,313 | 1/1914 | Choate .................. | 101/128.4 |
| 2,245,770 | 6/1941 | Franzmann ............. | 83/684X |
| 2,622,516 | 12/1952 | Heath .................... | 101/128.4 |
| 3,020,836 | 2/1962 | Palmer et al ............ | 101/128.4X |

FOREIGN PATENTS
| | | | |
|---|---|---|---|
| 26,317 | 11/1923 | France ................... | 101/128.4 |

*Primary Examiner*—William S. Lawson
*Attorney*—Cushman, Darby and Cushman

ABSTRACT: Press for cutting rubber stencils, such as those used in the engraving of stone, metal or other hard surfaces, consisting of a polyurethane cushioned tray in which stencils are cut and of a frame in which stencil cutters are positioned; the tray and the frame co-operate to distribute the stress applied by a pressure plate thereby insuring that all cutters cut equally well the rubber without cutting a plastic backing on the rubber stencil.

INVENTORS
Edmund SANDBORN
Alfred AZZOPARDI

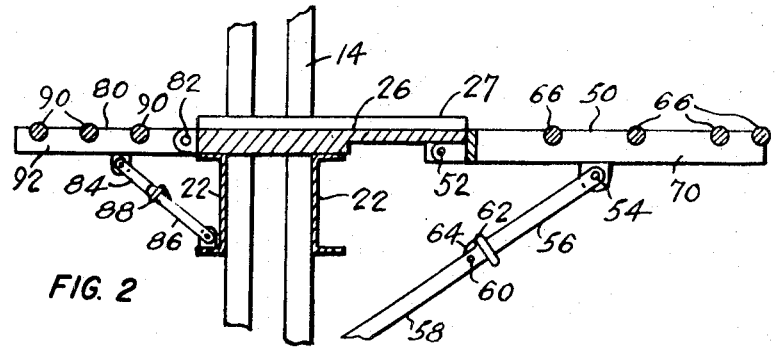
FIG. 2
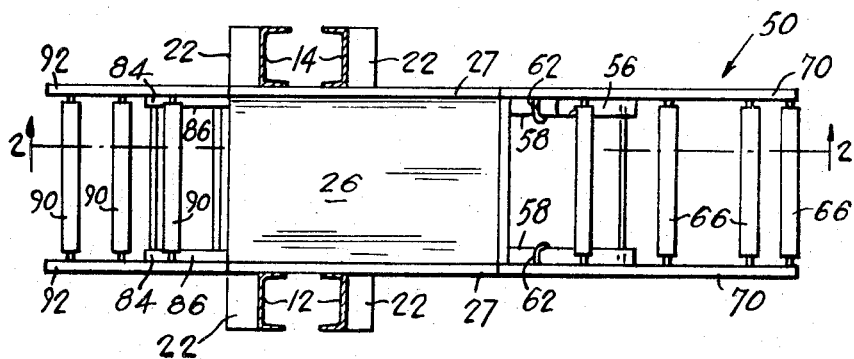
FIG. 3
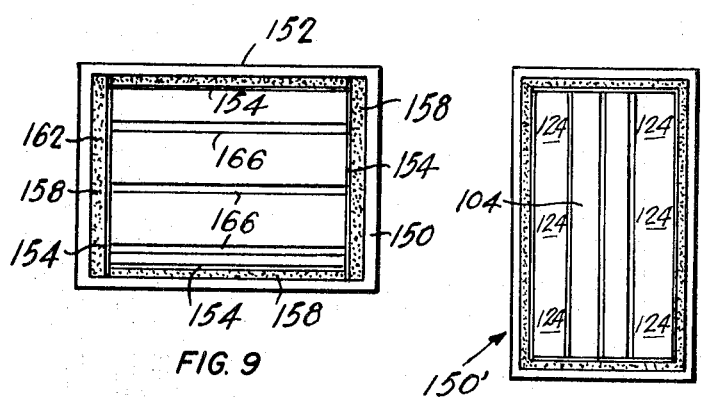
FIG. 9
FIG. 10
INVENTORS
Edmund SANDBORN
Alfred AZZOPARDI
By
Cushman, Darby & Cushman
ATTORNEY Patented Oct. 6, 1970

INVENTORS
Edmund SANDBORN
Alfred AZZOPARDI

By Cushman, Darby & Cushman
ATTORNEYS

PRESS FOR CUTTING RUBBER STENCILS

Generally the presses used for cutting stencils cut only a single letter or sometimes a single row of letters by multiple compression of a pressing operation. Cutting of a single row of letters on conventional presses has posed a serious problem of letter damage and for this reason has not been widely accepted. Cutting of a plurality of rows of letters has not heretofore been applied commercially to applicant's knowledge. When a plurality of letters is to be cut simultaneously using the prior art press systems it has been found that when sufficient force is applied to have all the cutters operate the pressure at the centre of the press plate is so great that the letters in this position were frequently damaged. Furthermore the backing on standard stencil cuts through with unequal pressure on letters against a hard base.

It is thus an object of the present invention to provide a press which allows the cutting of a whole stencil in one operation while preventing excessive pressure on any of the letters or the plastic backing on a standard rubber stencil.

Applicant achieves the above and other objects by providing a special polyurethane cushioned tray on which the stencils are cut and a special frame in which the stencil cutters are positioned, and this tray and frame cooperate to distribute properly the stress applied by the press, thereby insuring that all letters cut equally well while reducing letter damage in the press and preventing the cutting of the standard plastic stencil backing.

Broadly, the present invention comprises a tray, a resilient pad having an upper surface in said tray, a central and a pair of C-shaped depressed border sections formed along both ends and part way along both sides of said pad, produced during the polymerization of a supporting and adhesive epoxy compound layer beneath said pad by compressing a plurality of segments in the centre and along said ends while allowing the remainder of the pad to be formed to fit the pressure plate exactly as deformed under pressure, the segments along said ends being spaced farther from said adjacent top surface than segments along said sides with the farthest segment from said ends being the closest to its adjacent top surface, and those segments therebetween being progressively farther spaced from said adjacent top surface the closer each segment is to said ends. The present invention also comprises a letter-holding frame having a peripheral frame adapted to overlay said pad with said peripheral frame overlaying said sections and adapted to be received in said sections.

Further features, objects and advantages will be evident from the following detailed description taken in conjunction with the accompanying drawings in which:

FIG. 2 is a partial section through a modified press having a table extension at opposite sides of the table;

FIG. 3 is a plan view with parts broken away to illustrate the table extensions of FIG. 2;

FIG. 9 is a plan view of one form of letter-holding frame for use in the present invention; and FIG. 10 is a plan view of extended tray for larger stencils with frame attached to a pad.

Figure 1:
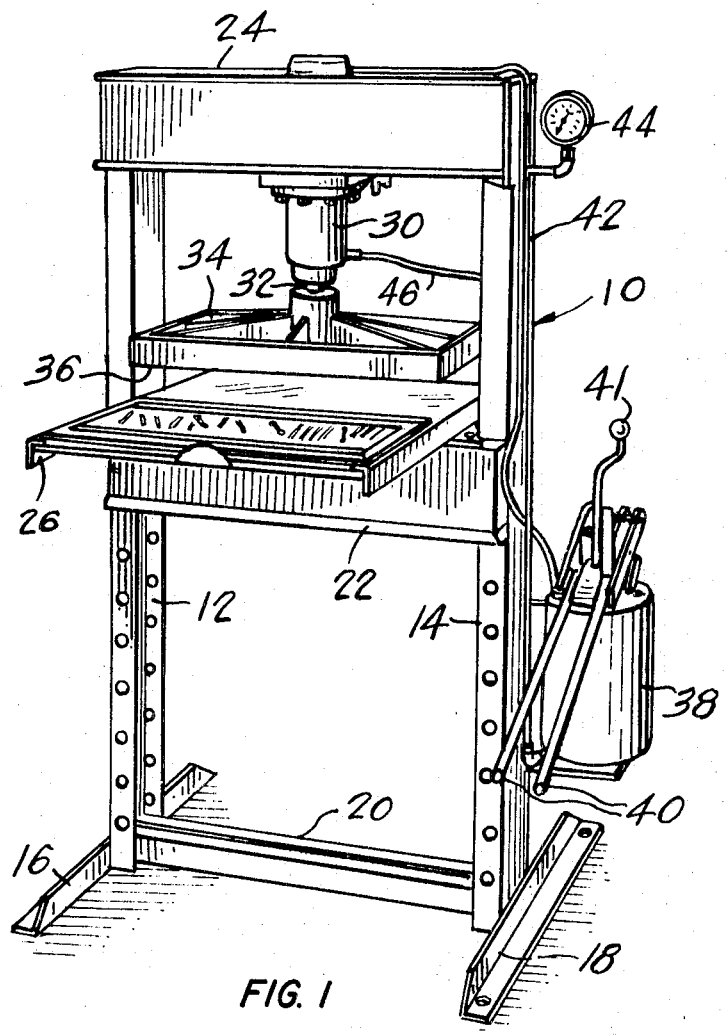
FIG. 1 is a perspective view of one type of press which may be used with the present invention.
Figure 4:
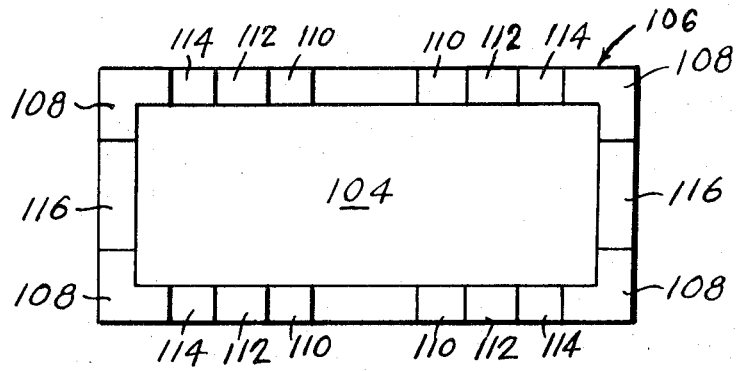
FIG. 4 is a plan view of the pad with a forming template positioned for insertion into the press.
Figure 5:
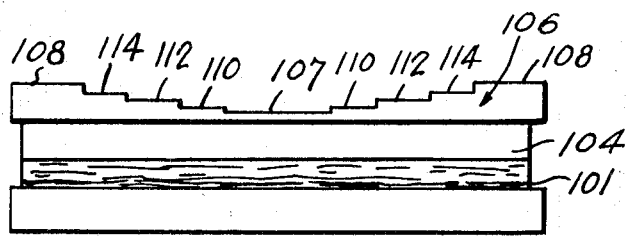
FIG. 5 is an end view of FIG. 4 showing the pad and template with exaggerated thickness.

Referring now to FIG. 1, one form of press suitable for use with the present invention will now be generally described. The press 10 comprises a pair of uprights 12 and 14 standing on feet 16 and 18 and interconnected by cross members 20, 22, 22, and 24, 24. The cross members 22, 22 and 24, 24, are channel irons with the member 24, 24 supporting the hydraulic cylinder 30 of the press. The cylinder 30 has a piston with a shaft 32 slidable therein and mounted on the end of the shaft 32 is the pressure plate 34 the face 36 of which is substantially parallel to the surface of the table 26 in non-loaded condition. When pressure is applied the plate 34 is deflected as will be described hereinbelow. Hydraulic fluid to operate the press is contained in the reservoir 38 which also contains the pumps for raising and lowering the plate 34. To lower the pressure plate 34 one of the handles 40 is manipulated to apply pressure fluid via line 42 and pressure gauge 44 into the cylinder 30 while fluid flows from the cylinder (from in front of the piston) back to the reservoir 38 via return line 46. When the plate 34 reaches the surface to be compressed the other handle 30 is manipulated to give a higher operation to force ratio, thus obtaining the desired pressure. A release via handle 41 to permit fluid to return to the reservoir 38 via line 42 lifts the piston 32 on plate 34. Other means, for example, a pneumatic system may be used in place of the hydraulic system described for raising and lowering the plate 34.

In some cases it is desirable to permit larger stencils to be placed on a larger tray (FIG. 9) and pressed in a plurality of pressing operations. A simple one-piece extension for the table 26 suitable for this purpose or hinged as in FIGS. 2 and 3 has been illustrated.

In this embodiment the table 26 has been modified by the addition of a pair of extensions 50 and 80.

The extension 50 is pivoted to one side of the table 26 by a pin 52 and is retractably held in position by means of two pairs of links 56 and 58; the links 56 are pivoted to the frame of the extension 50 by a pin 54 and the links 56 and 58 are pivotably interconnected by pins 60. The opposite end of each link 58 is pivoted to the uprights 12 and 14. Each pair of links 56 and 58 are locked in position by a ring 62 slidable along the links and over the end of link 58 projecting beyond the pin 60. The extension 50 mounts a plurality of rollers 66 in side frame members 70 which facilitate moving material into the press.

Guides 27 along the border of the table 26 centre the tray beneath the pressure plate.

The second extension 80 is pivoted to the other side of the table 26 by a pin 82 and is supported in operational position by a plurality of pairs of links 84 and 86 (only one shown) similar to links 56 and 58 and rings 88 (only one shown) similar to ring 62. The surface of the extension 80 is formed by a plurality of laterally extending rollers 90 mounted between the end members 92 which rollers 90 facilitate removal of material from the press.

The tray 100 which forms one of the main parts of the invention is shown in FIGS. 4, 5, 6, 7, and 8. This tray 100 is composed of a rigid backing member 102 and a resilient pad 104 secured to the member 102 by epoxy resin or the like. The pad 104 has a central and a pair of border sections 120 at a level below the adjacent levels of the resilient pad, as will be described hereinbelow.

To form the pad 104 to the required shape, the pad 104 and backing member 102 with a layer of epoxy resin therebetween (see FIGS. 4 and 5) are placed into the press. A suitable template frame 106 is placed over and covers the border areas of the pad 104. In the illustrated arrangement the template 106 has each of its corners 108 built up by means of a plurality of stepped sections so that the frame has its thinnest section 107 adjacent to the centre of the pad 104 and increases in thickness as it approaches the corners 108 by means of segments 110, 112 and 114. The ends of the frame 106 are reduced in thickness as illustrated at 116. Generally applicant has found that a layer of uncured epoxy resin of about one-sixteenth inch thick between the pad 104 and plate 102 before pressure is applied is sufficient to obtain the proper forming of the pad. Preferably the pad 104 is polyurethane sheet about one-eighth inch thick which provides a very tough but resilient backing which facilitates the cutting operation; such material has sufficient rigidity to cut the rubber stencil, but is sufficiently resilient to prevent cutting the plastic backing of the stencil.

With the frame 106, pad 104, resin 101 and backing 102 positioned as above described beneath the pressure plate 34, the press is closed and pressure is applied to the frame 106 and the pad 104. Pressure on frame 106 tends to trap the uncured epoxy resin beneath the pad 104 while pressure on the pad 104 redistributes the resin 101 under the pad which forces the pad 104 in the areas not covered by the frame 106 into intimate contact with and to conform substantially exactly to the surface 36 of the pressure plate 34. The excess epoxy escapes from under the pad 104. With the pressure applied as above described, the epoxy resin is set thereby permanently, conforming the pad 104 to the surface 36 as depressed under pressure.

Figure 6:
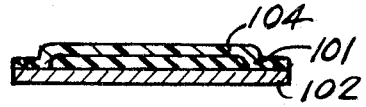
FIG. 6 is an end view of a tray with a formed pad through a line 6–6 of FIG. 8.
Figure 7:
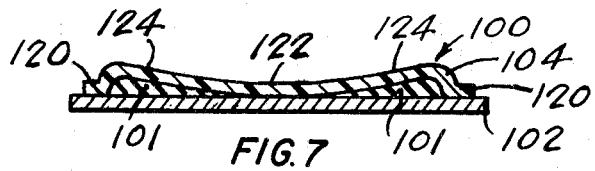
FIG. 7 is a sectional view along the line 7–7 of FIG. 8.
Figure 8:
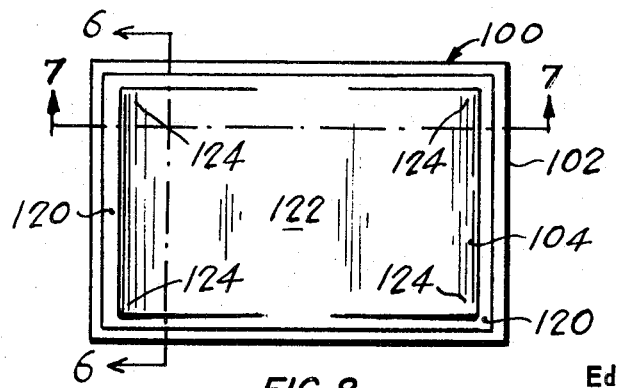
FIG. 8 is a plan view of the tray.

The pad 103 formed as above described is illustrated in FIGS. 6, 7 and 8. As illustrated, the pad 104 has a pair of C-shaped border sections 120 which are of substantially uniform thickness equal to the thinnest section of the pad 104 which is the central area generally indicated at 122 (i.e. the section bounded by the segments 107). The pad 104 gradually increases in thickness from the thinnest section 122 to its thickest sections 124 in the corners of the pad. As illustrated in FIG. 7, the epoxy resin forms the backing for the pad 104 and is contoured to deform the surface of pad 104 to conform substantially exactly to the surface of the pressure plate deformed when under pressure. Just sufficient resin for bonding usually remains under the border sections 120 and the central section 122.

For a 25 ton press applicant has found that the four steps, i.e., 107 and 110; 112 and 114 should be uniform with each segment being 0.003 inches above the adjacent segments and the surfaces of the sloping segments sloping 0.001 inch along the length of each segment. When a different sized press having a different pressure plate is used the sections 106 and 108 will have a different configuration depending on the deflection of the plate 34 under pressure. In place of the descrete steps formed by the segments as above described, the corners 108 may be formed as a substantially continuous curve from the surface 107 to the upper surface 108. Another method of obtaining the equalizing of levels, particularly useful for a long tray, is to elevate the desired areas 124 which will accept the pressure from the ends of the plate by progressively increasing thicknesses of double sided adhesive tape in order to achieve exactly the same form as that obtained by the hereinbefore described epoxy resin.

In FIG. 9 the letter frame 150 forming another key part of the instant invention has been illustrated. This frame 150 is composed of a rigid peripheral frame 152. Mounted on inwardly facing end walls of the frame 152 are resilient strips 158 (formed of foam plastic or the like) which are faced with flexible plates 154 and 156. Bars 166 (three shown) are frictionally held in position between the plate 154 by pressure applied by the resilient strips. The bars 166 hold the stencil cutting dies in position on the frame 150.

A similar frame 150' is shown in FIG. 10. This frame 150' is elongated so that only a section thereof will be under the platen 34 in any one pressing operation. With this elongated frame the whole message may be set up and then pressed in sequence by advancing the frame 150' with the material to be cut.

In operating the present invention the stencil material to be cut is placed on the pad 104 with the frame 150 containing the required dies lying over the stencil material and with the frame 152 directly over the C-shaped sections 120 on the pad. The pressure plate 34 is then lowered onto the frame 150 and pressure is applied to the dies to cut the letters. The use of template 106 in the moulding under the pressure of the pad 104 through varying the thickness of its epoxy bonding material has now produced a tray which distributes equally pressure on all of the die cutting letters, regardless of their lateral position relative to the centre line of the piston 32 so that the dies cut uniformly and accurately regardless of their position under the plate 34 without undue breakage of dies or cutting of the standard plastic backing of the rubber stencil. After the dies are removed from the stencil adhesive tape applied to the face of the stencil with a stencil roller adheres sufficiently to the stencil to allow removal of the plastic backing. When applied to the surface to be engraved the adhesive tape and the cut letters, or designs, are removed and sand blasting can be done without any lamination obstructing the pathway of the sand.

Modifications will be evident to the skilled in the art without departing from the invention as defined in the appended claims.

We claim:

1. An apparatus for use in cutting stencils comprising: a rigid backing plate, a resilient pad and a substantially rigid filler material being of varying thickness, thereby deforming the upper surface of said pad to form a pair of opposed C-shaped border sections and a central area of substantially the same thickness and corner sections contained within said C-shaped sections said filler material being thickest in said corner sections and being thinner in said C-shaped border sections and said central area being thinnest.

2. An apparatus as defined in claim 1, wherein said pad is a polyurethane sheet.

3. An apparatus as defined in claim 1, wherein said filler is set epoxy resin.

4. An apparatus as defined in claim 1, wherein said pad is a polyurethane sheet approximately one-eighth inch thick and wherein said filler is set epoxy resin.